US012238421B2

(12) United States Patent
Tanaka (10) Patent No.: US 12,238,421 B2
(45) Date of Patent: Feb. 25, 2025

(54) IMAGE CAPTURE APPARATUS REMOTELY CONTROLLABLE BY AN OPERATION APPARATUS AND RELATED CONTROL METHOD

(71) Applicant: CANON KABUSHIKI KAISHA, Tokyo (JP)

(72) Inventor: Ryosuke Tanaka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 194 days.

(21) Appl. No.: 18/155,894

(22) Filed: Jan. 18, 2023

(65) Prior Publication Data

US 2023/0276131 A1 Aug. 31, 2023

(30) Foreign Application Priority Data

Feb. 1, 2022 (JP) ................. 2022-014437

(51) Int. Cl.
*H04N 23/695* (2023.01)
*G06T 7/20* (2017.01)
*G06V 10/44* (2022.01)
*H04N 23/69* (2023.01)

(52) U.S. Cl.
CPC ............. *H04N 23/695* (2023.01); *G06T 7/20* (2013.01); *G06V 10/44* (2022.01); *H04N 23/69* (2023.01); *G06V 2201/07* (2022.01)

(58) Field of Classification Search
CPC .... H04N 23/695; H04N 23/69; H04N 23/611; H04N 23/6811; H04N 23/661; G06T 7/20; G06V 10/44; G06V 2201/07; G06V 10/62; G06V 10/25
See application file for complete search history.

(56) References Cited

U.S. PATENT DOCUMENTS

| 10,356,301 | B2 | 7/2019 | Oshima | |
| 2002/0054211 | A1* | 5/2002 | Edelson | H04N 7/183 348/169 |
| 2018/0017659 | A1* | 1/2018 | Irie | H04N 23/695 |
| 2020/0041619 | A1* | 2/2020 | Maheshwari | H04N 23/689 |
| 2021/0103736 | A1* | 4/2021 | Toyoda | H04N 23/695 |

FOREIGN PATENT DOCUMENTS

JP 6557768 B 8/2019

\* cited by examiner

*Primary Examiner* — Gevell V Selby
(74) *Attorney, Agent, or Firm* — Venable LLP (57) ABSTRACT

An image capture apparatus, remotely controllable by an operation apparatus, includes an image capturing unit capturing an image, a communication unit communicating with the operation apparatus, an image processing unit detecting an object in the image, and a control unit performing framing control of the image including the object, based on a framing operation from the operation apparatus, after the communication unit transmits the image to the operation apparatus, and a delay acquisition unit acquiring a delay time in the communication processing. The image processing unit calculates a framing control amount based on a predicted movement amount of the object in the delay, an actual movement amount of the object before and after the delay, and a framing operation amount from the operation apparatus. The control unit performs the framing control based on the framing control amount, and the delay acquisition unit acquires the delay time, before shooting, in advance.

15 Claims, 8 Drawing Sheets

IMAGE CAPTURE APPARATUS REMOTELY CONTROLLABLE BY AN OPERATION APPARATUS AND RELATED CONTROL METHOD

CROSS-REFERENCE TO PRIORITY APPLICATION

This application claims the benefit of Japanese Patent Application No. 2022-014437, filed Feb. 1, 2022, which is hereby incorporated by reference herein in its entirety.

BACKGROUND OF THE INVENTION

Field of the Invention

The present invention relates to techniques for remotely controlling an image capture apparatus.

Description of the Related Art

An image capture apparatus that is capable of framing control in each direction of pan, tilt, and zoom by remote control from an operation apparatus has been known. A user receives and displays an image shot by the image capture apparatus in the operation apparatus, thereby performing the framing operation while viewing the image and shooting a desired object.

Japanese Patent No. 6557768 describes a method in which, when an image capture apparatus is remotely controlled to track an object, the position of the object is predicted in consideration of communication delay, and pan and tilt operations are controlled based on the predicted position of the object.

In Japanese Patent No. 6557768, when an object to be tracked is specified by a user, the image capture apparatus automatically performs framing control on the object to be tracked, and, therefore, an object position is not predicted in consideration of the framing operation of the user. In addition, in Japanese Patent No. 6557768, the user specifies an object to be tracked by viewing an image received in a delay due to a communication delay. Therefore, when a movement direction and a movement speed of an object that is to be tracked changes, the user may not be able to specify the object as intended by the user.

SUMMARY OF THE INVENTION

The present invention has been made in consideration of the aforementioned problems, and realizes techniques for framing as intended by a user even when a communication delay occurs when shooting is performed by remote control of an image capture apparatus.

In order to solve the aforementioned problems, the present invention provides an image capture apparatus that is remotely controllable by an operation apparatus, comprising an image capturing unit that captures an image, a communication unit that communicates with the operation apparatus, an image processing unit that detects an object in the image, and a control unit that performs framing control of the image including the object based on a framing operation received from the operation apparatus after transmitting the image to the operation apparatus by the communication unit, wherein the image processing unit calculates a framing control amount based on a delay time in communication processing with the operation apparatus, a predicted movement amount of the object in the delay time, an actual movement amount of the object before and after the delay time, and a framing operation amount received from the operation apparatus, and the control unit performs the framing control based on the framing control amount.

In order to solve the aforementioned problems, the present invention provides a method of controlling an image capture apparatus that includes an image capturing unit that captures an image and is remotely controllable by an operation apparatus, the method comprising communicating with the operation apparatus, detecting an object in the image, and performing framing control of the image including the object based on a framing operation received from the operation apparatus after transmitting the image to the operation apparatus, wherein the framing control is performed based on a framing control amount calculated based on a delay time in communication processing with the operation apparatus, a predicted movement amount of the object in the delay time, an actual movement amount of the object before and after the delay time, and a framing operation amount received from the operation apparatus.

In order to solve the aforementioned problems, the present invention provides a non-transitory computer-readable storage medium storing a program that causes a computer to execute a method of controlling an image capture apparatus that includes an image capturing unit that captures an image and is remotely controllable by an operation apparatus, the method comprising communicating with the operation apparatus, detecting an object in the image, and performing framing control of the image including the object based on a framing operation received from the operation apparatus after transmitting the image to the operation apparatus, wherein the framing control is performed based on a framing control amount calculated based on a delay time in communication processing with the operation apparatus, a predicted movement amount of the object in the delay time, an actual movement amount of the object before and after the delay time, and a framing operation amount received from the operation apparatus.

According to the present invention, framing can be performed as intended by the user even when a communication delay occurs when shooting is performed, by remotely controlling the image capture apparatus.

Further features of the present invention will become apparent from the following description of exemplary embodiments (with reference to the attached drawings).

DESCRIPTION OF THE EMBODIMENTS

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and a redundant description thereof is omitted.

The following will describe embodiments, in which an image capture apparatus according to the present invention is applied to, for example, a digital camera that is capable of framing control by remote control, and an operation apparatus according to the present invention is applied to a remote controller that is capable of remote control of the image capture apparatus, in detail with reference to the accompanying drawings. Note that the operation apparatus is not limited to the remote controller, and may be a communication terminal, such as a smartphone, or an information processing terminal, such as a tablet PC (a personal computer).

Apparatus Configuration

First, configurations and functions of the image capture apparatus and the operation apparatus according to the present embodiment will be described with reference to FIGS. 1 to 5.

Figure 1:
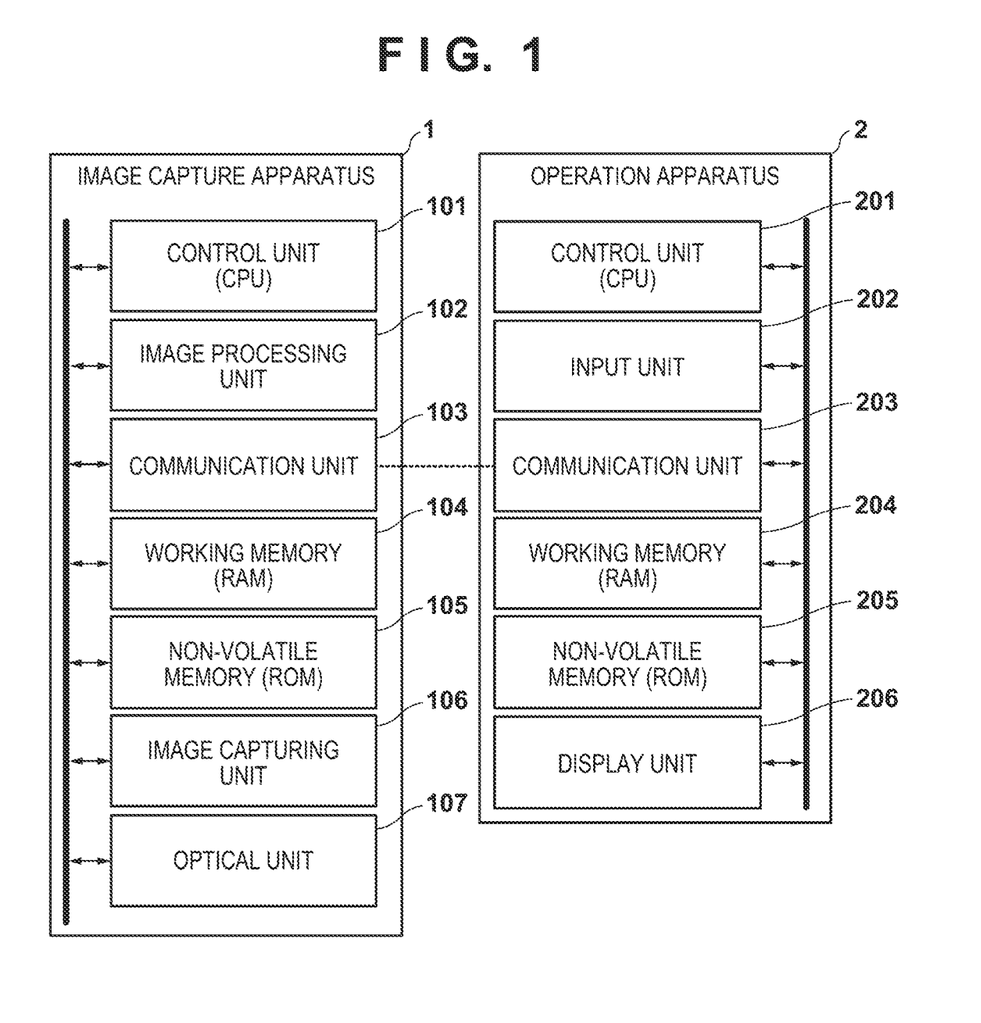
FIG. 1 is a block diagram illustrating configurations of an image capture apparatus and an operation apparatus according to the present embodiment.

FIG. 1 illustrates an example of hardware configurations of the image capture apparatus and the operation apparatus according to the present embodiment.

In FIG. 1, an image capture apparatus 1 and an operation apparatus 2 are communicably connected. The operation apparatus 2 can remotely control the image capture apparatus 1. The image capture apparatus 1 is remotely controlled by the operation apparatus 2 to capture an image, and transmit the captured image data to the operation apparatus 2. A user can remotely operate the image capture apparatus 1 by the operation apparatus 2. The user performs a framing operation using the operation apparatus 2, and performs a framing control that changes a shooting range (an angle of view) of the image capture apparatus 1 to ensure monitoring the image shot by the image capture apparatus 1 in real time from a remote location. Furthermore, the image capture apparatus 1 has an object recognition function and a tracking function, and can automatically track a predetermined object.

The image capture apparatus 1 is disposed at a location where the object can be captured. The operation apparatus 2 is disposed in a remote location where the user cannot directly operate the image capture apparatus 1 or the operation apparatus 2 is held by the user at a remote location where the user cannot directly operate the image capture apparatus 1. The image capture apparatus 1 and the operation apparatus 2 are connected by, for example, a wireless communication method, and can transmit and receive information.

In a case when the image capture apparatus 1 shoots a moving object by remote control of the operation apparatus 2, it is assumed that framing cannot be performed as intended by the user due to a communication delay between the image capture apparatus 1 and the operation apparatus 2. In the present embodiment, a configuration and control for performing framing as intended by the user in this case will be described.

Figure 2:
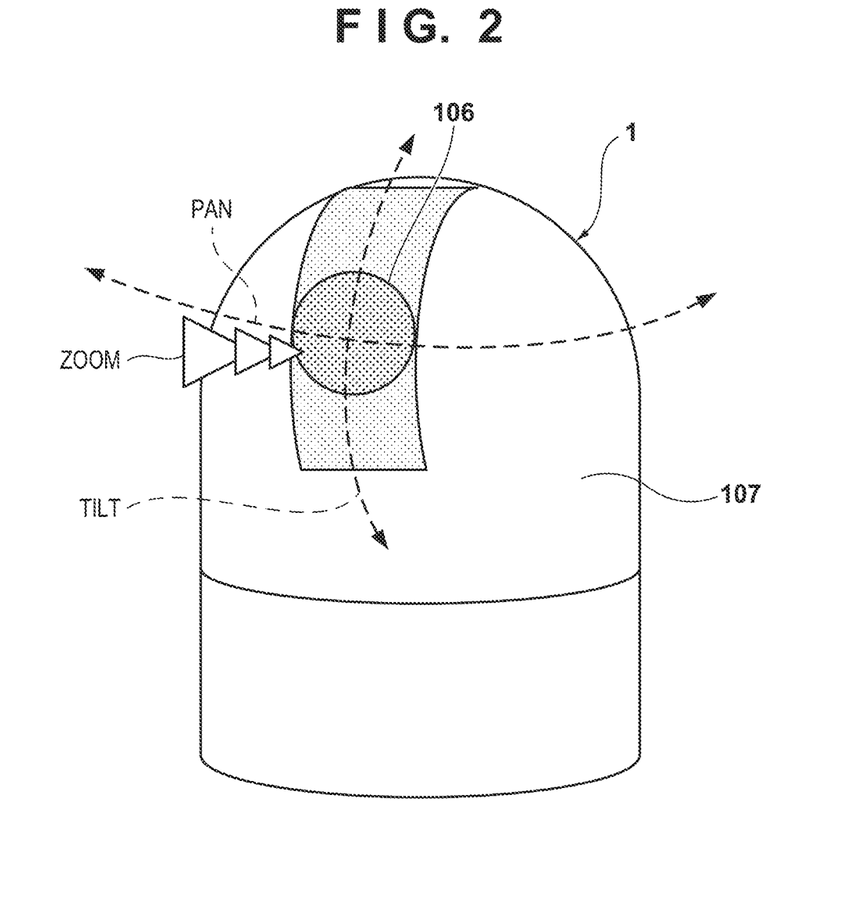
FIG. 2 is an external view of the image capture apparatus according to the present embodiment.

FIG. 2 illustrates an example of an exterior configuration of the image capture apparatus 1 according to the present embodiment.

The image capture apparatus 1 includes a control unit 101, an image processing unit 102, a communication unit 103, a working memory 104, a non-volatile memory 105, an image capturing unit 106, and an optical unit 107.

The control unit 101 performs arithmetic processing for controlling the image capture apparatus 1. The control unit 101 includes a processor, such as a CPU, that controls the components of the image capture apparatus 1.

The image processing unit 102 performs arithmetic processing of image data acquired by the image capturing unit 106, arithmetic processing of data for evaluation metering acquired by the image capturing unit 106, and arithmetic processing of control data for controlling the optical unit 107.

The communication unit 103 includes an interface for communicatively connecting to the operation apparatus 2. The interface is, for example, a wireless communication interface compliant with a wireless communication method, such as Wi-Fi (registered trademark), Bluetooth (registered trademark), infrared communication, and Wireless USB, and a public wireless communication method, such as 4G or 5G. The communication unit 103 can transmit and receive image data and information, such as an operation signal, with the operation apparatus 2.

The working memory 104 is, for example, a RAM. The working memory 104 is used as a work area for loading, for example, constants and variables for operation of the control unit 101, and a program read out from the non-volatile memory 105 described later. The working memory 104 is used as a buffer memory that temporarily holds the image data captured by the image capturing unit 106.

The non-volatile memory 105 is, for example, a ROM. The non-volatile memory 105 stores, for example, a constant and a program for operation of the control unit 101. Here, the program is a program for executing communication processing and control processing described later in the present embodiment.

The image capturing unit 106 includes an image sensor comprised of a photoelectric conversion element, such as a CCD or a CMOS, which converts an object image into an electrical signal, and an A/D converter that converts an analog signal output from the image sensor into a digital signal. The image capturing unit 106 converts an object image light formed by a lens included in the optical unit 107, described later, by the control of the control unit 101 into the electrical signal by the image sensor, and performs, for example, noise reduction processing to output image data formed of the digital signal.

The optical unit 107 includes a lens group including a zoom lens or a focus lens, a shutter with an aperture diaphragm function, and a mechanism for driving these optical members. The optical unit 107 drives the optical member to perform at least any of rotation of the shooting range (the angle of view) of the image capture apparatus 1 about a pan (P) axis (horizontal direction) or a tilt (T) axis (vertical direction), and movement along a zoom (Z) axis (enlargement/reduction direction).

Note that an example of the image capture apparatus 1 according to the present embodiment being a camera having a PTZ function, will be described, but is not limited thereto. For example, the image capture apparatus 1 can perform framing by moving or rotating the fuselage itself, such as a drone, or can perform framing by moving or rotating the image capture apparatus 1 by externally-attached equipment like a movable camera platform, such as a gimbal.

Note that the PTZ function is a function that is capable of controlling a swing in each of directions, pan, tilt, and zoom, of the image capture apparatus 1 by remote control. The PTZ is an abbreviation for respective head letters of pan (Panoramic), tilt (Tilt), and zoom (Zoom). The pan (Panoramic) is a horizontal swing. The tilt is a swing in the vertical direction. The zoom is a zoom-up (telephoto) and zoom-out (wide angle).

Figure 3:
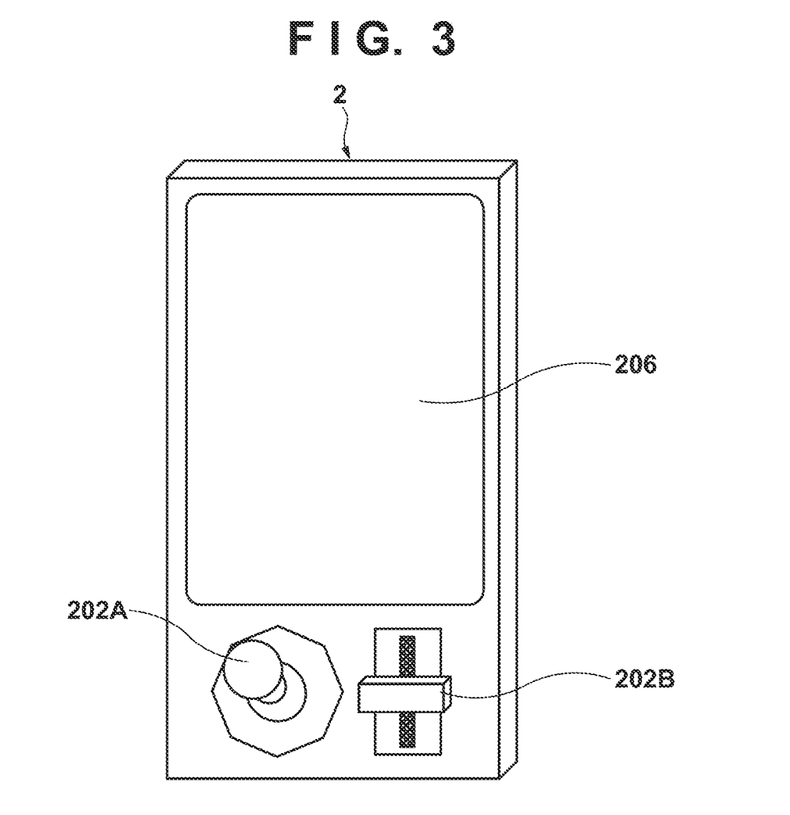
FIG. 3 is an external view of the operation apparatus according to the present embodiment.

FIG. 3 illustrates an example of an exterior configuration of the operation apparatus 2 according to the present embodiment.

The operation apparatus 2 includes a control unit 201, an input unit 202, a communication unit 203, a working memory 204, a non-volatile memory 205, and a display unit 206.

The control unit 201 performs arithmetic processing for controlling the operation apparatus 2. The control unit 201 includes a processor, such as a CPU, that controls the components of the operation apparatus 2.

Figure 4:
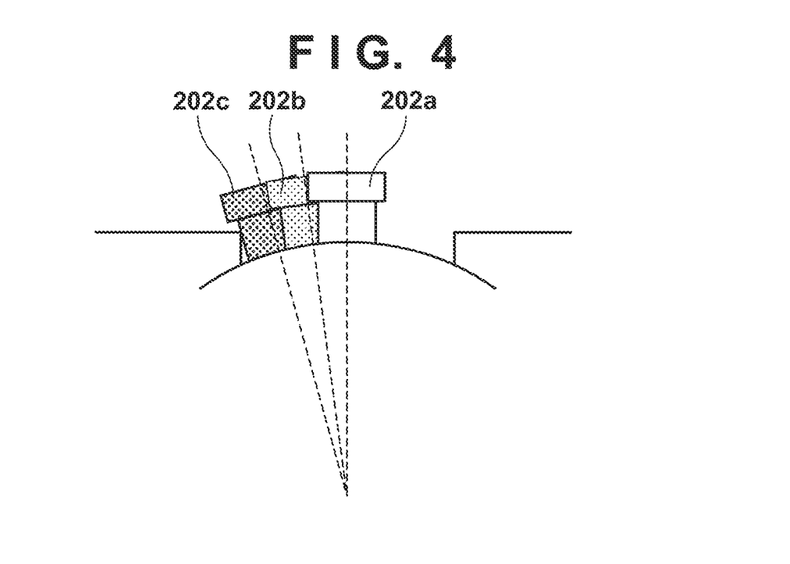
FIG. 4 is an explanatory diagram of an input unit in the operation apparatus according to the present embodiment.

The input unit 202 includes an operation member that accepts a user operation, and outputs an operation signal in accordance with the user operation to the control unit 201. As illustrated in FIG. 3, the input unit 202 includes a joy stick 202A and a slide bar 202B. As illustrated in FIG. 4, the input unit 202 can input a direction and a magnitude of an operation as the operation signal according to a direction and a distance (stroke) of moving the operation member.

FIG. 4 illustrates an example of operation positions of the joy stick 202A and the slide bar 202B. Operation positions 202a, 202b, and 202c indicate states in which an operation amount of the operation member is zero, the intermediate amount, and the maximum amount, respectively. The joy stick 202A can input an arbitrary operation direction of three hundred sixty degrees by the direction of moving the operation member with the center position (neutral position) of the movable range of the operation member as the operation amount of zero. The slide bar 202B can input any opposing operation direction of 180 degrees by the direction of moving the operation member with the center position (neutral position) of the movable range of the operation member as the operation amount of zero.

The input unit 202 enables an operation of at least any of pan, tilt, zoom, focus, and aperture diaphragm of the image capture apparatus 1, and the respective operations, pan by the operation in the left-and-right direction and tilt by the operation in the front-and-rear direction of the joy stick 202A, and the zoom by the operation in the front-and-rear direction of the slide bar 202B, are possible.

Note that the input unit 202 may be any configuration as long as the direction and the magnitude of the operation can be input, and, for example, may be a touch panel integrally configured with the display unit 206 described later on which input can be performed by a finger of a user or a stylus. Furthermore, the operation member of the input unit 202 is not limited to the joy stick 202A or the slide bar 202B, and, for example, may include any button including a numeric keypad, or they may be configured in a touch panel.

The communication unit 203 includes an interface for communicatively connecting to the image capture apparatus 1. The interface is, for example, a wireless communication interface compliant with a wireless communication method, such as Wi-Fi (registered trademark), Bluetooth (registered trademark), infrared communication, and Wireless USB, and a public wireless communication method, such as 4G or 5G. The communication unit 203 can transmit and receive image data and information, such as an operation signal, with the image capture apparatus 1.

The working memory 204 is, for example, a RAM. The working memory 204 is used as a work area for loading, for example, constants and variables for operation of the control unit 201 and a program read out from the non-volatile memory 205, described later. The working memory 204 is used as a buffer memory that temporarily holds the image data received from the image capture apparatus 1.

The non-volatile memory 205 is, for example, a ROM. The non-volatile memory 205 stores, for example, a constant and a program for operation of the control unit 201. Here, the program is a program for executing communication processing and control processing, described later, in the present embodiment.

In a case when the operation apparatus 2 is a smartphone or a tablet PC, the non-volatile memory 205 stores an operating system (OS), which is basic software executed by the control unit 201, and an application for controlling the image capture apparatus 1 by remote control in cooperation with this OS. The processing of the operation apparatus 2 is realized by reading the software provided by the application.

The display unit 206 is a display device, such as a liquid crystal display or an organic EL display. The display unit 206, for example, displays the image received from the image capture apparatus 1 and a Graphical User Interface (GUI).

In cooperation with the image capture apparatus 1, the operation apparatus 2 achieves shooting by remote control. The image capture apparatus 1 captures an object to generate a live view image and transmits the image to the operation apparatus 2. The operation apparatus 2 displays the live view image received from the image capture apparatus 1. The user operates the input unit 202 while confirming the image captured by the image capture apparatus 1 on the display unit 206 in the operation apparatus 2. The operation apparatus 2 transmits the operation signal received by the input unit 202 to the image capture apparatus 1. The image capture apparatus 1 controls the optical unit 107 in accordance with the operation signal received from the operation apparatus 2. By repeatedly performing the operations described above, even in a case when the object moves, the user can frame the object as intended and shoot a moving image or a still image.

First Embodiment

The following will describe the first embodiment.

The first embodiment is an example of a control method that performs framing with respect to movement of the object in the horizontal direction (the pan direction) and the vertical direction (tilt direction).

In the first embodiment, it is assumed that the object moves on a plane perpendicular to an optical axis of the image capture apparatus 1, and the apparent size of the object in a frame is not considered in framing. The user performs the remote control with the operation apparatus 2 to move the optical unit 107 in the image capture apparatus 1 in the pan direction and the tilt direction, performs framing, and shoots the object.

Figure 5:
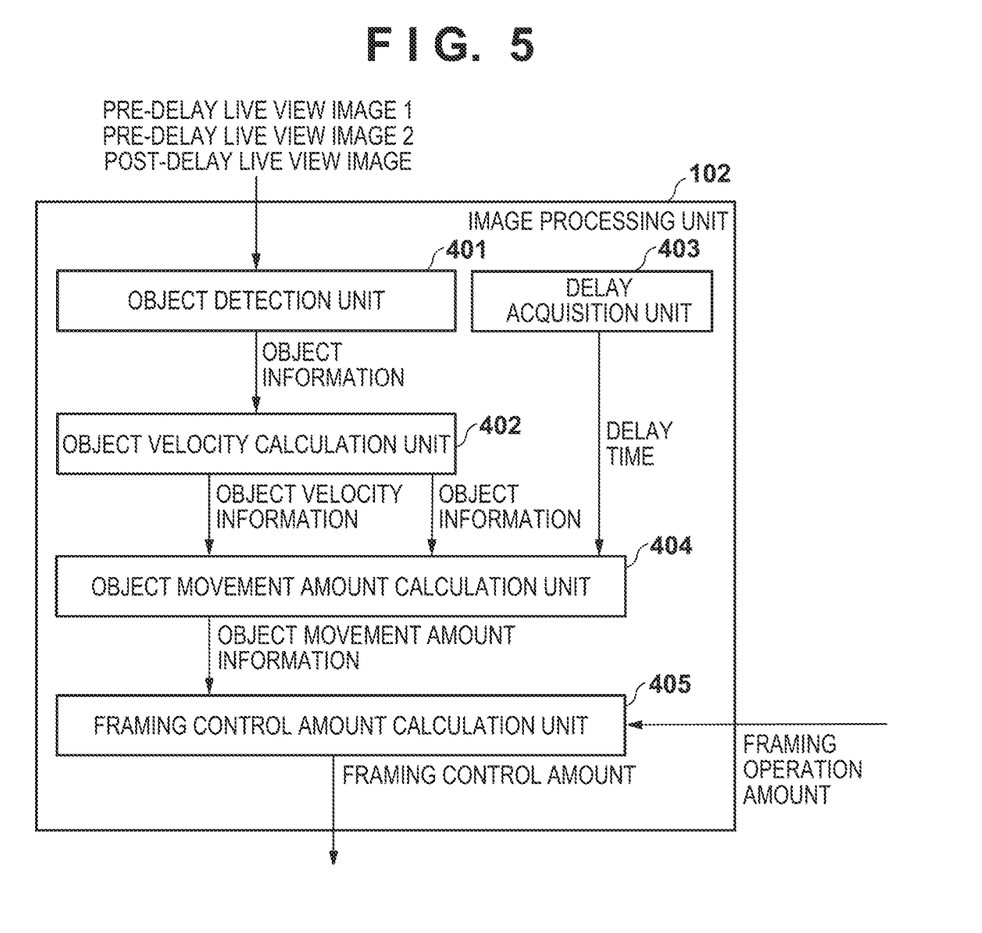
FIG. 5 is a block diagram illustrating a configuration of an image processing unit in the image capture apparatus according to a first embodiment.

FIG. 5 is a block diagram illustrating the configuration and functions of the image processing unit 102 according to the first embodiment.

The image processing unit 102 includes an object detection unit 401, an object velocity calculation unit 402, a delay acquisition unit 403, an object movement amount calculation unit 404, and a framing control amount calculation unit 405.

The object detection unit 401 detects a predetermined object (hereafter, a main object) in the live view image generated by the image capturing unit 106, and outputs object information, which is the detection result, to the object velocity calculation unit 402.

The object velocity calculation unit 402 calculates a velocity of the main object detected by the object detection unit 401 from the live view images in a plurality of frames generated by the image capturing unit 106, and outputs object velocity information, which is the calculation result, to the object movement amount calculation unit 404.

The delay acquisition unit 403 acquires a delay time until the optical unit 107 is driven by the framing operation, after the image capturing unit 106 captures the live view image, and outputs the acquired delay time information to the object movement amount calculation unit 404.

The object movement amount calculation unit 404 calculates a predicted movement amount of the main object in the delay time based on the velocity of the main object calculated by the object velocity calculation unit 402 and the delay time acquired by the delay acquisition unit 403. Then, the object movement amount calculation unit 404 outputs object movement amount information, which is the calculation result, to the framing control amount calculation unit 405. In addition, the object movement amount calculation unit 404 calculates an actual movement amount of the main object based on the live view images before and after the delay time, includes the movement in the object movement amount information, and outputs the movement to the framing control amount calculation unit 405.

The framing control amount calculation unit 405 calculates the framing control amount of the optical unit 107 based on the predicted movement amount of the main object calculated by the object movement amount calculation unit 404, the framing operation amount input from the operation apparatus 2, and the actual movement amount of the main object, before and after the delay time. Then, the framing control amount calculation unit 405 outputs the framing control amount, which is the calculation result, to the control unit 101. The control unit 101 drives the optical member of the optical unit 107 based on the framing control amount calculated by the framing control amount calculation unit 405.

Figure 9:
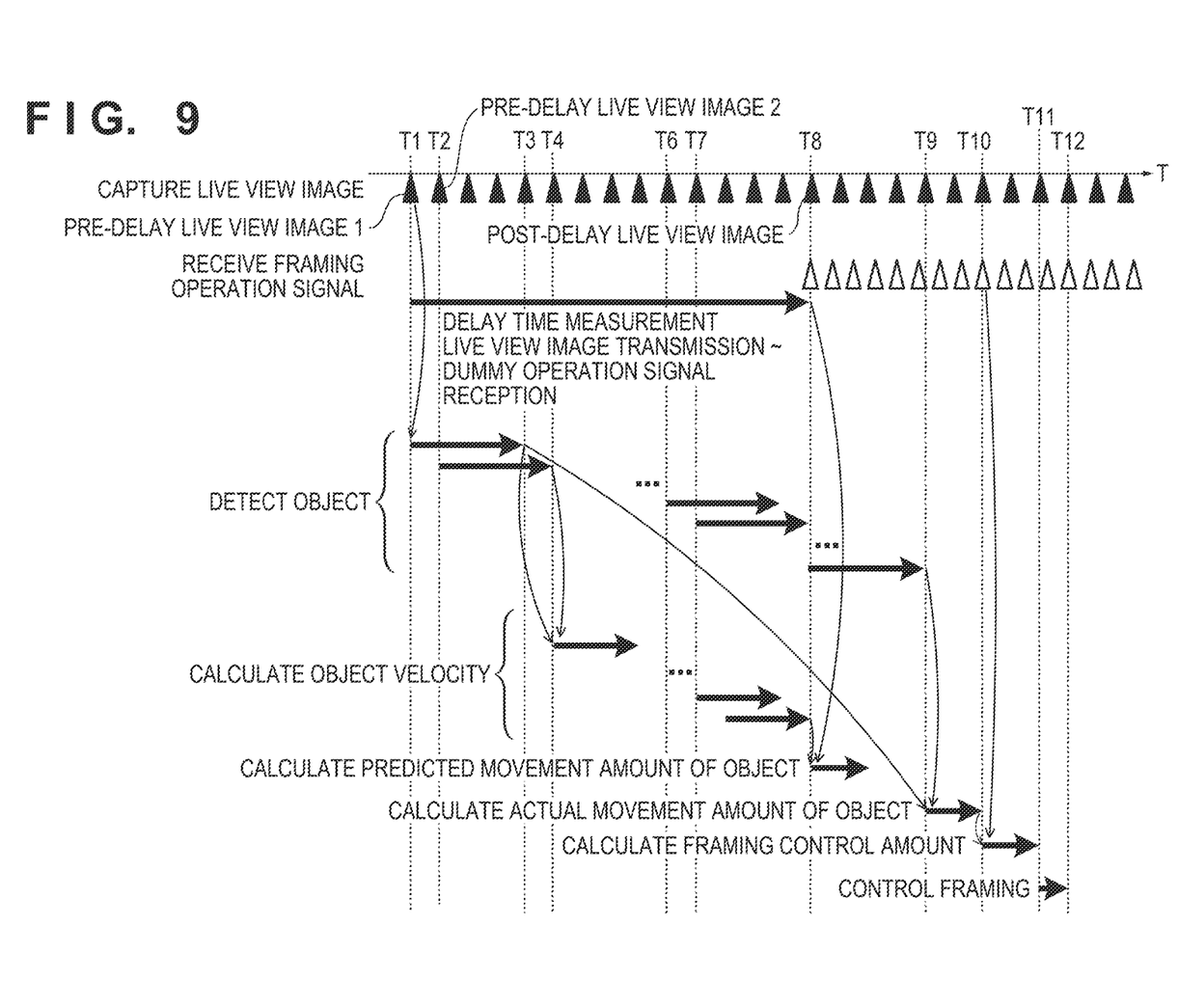
FIG. 9 is a timing chart of each processing step in the control example according to the first embodiment.

Next, the control according to the first embodiment will be described with reference to FIGS. 6 and 9.

Figure 6:
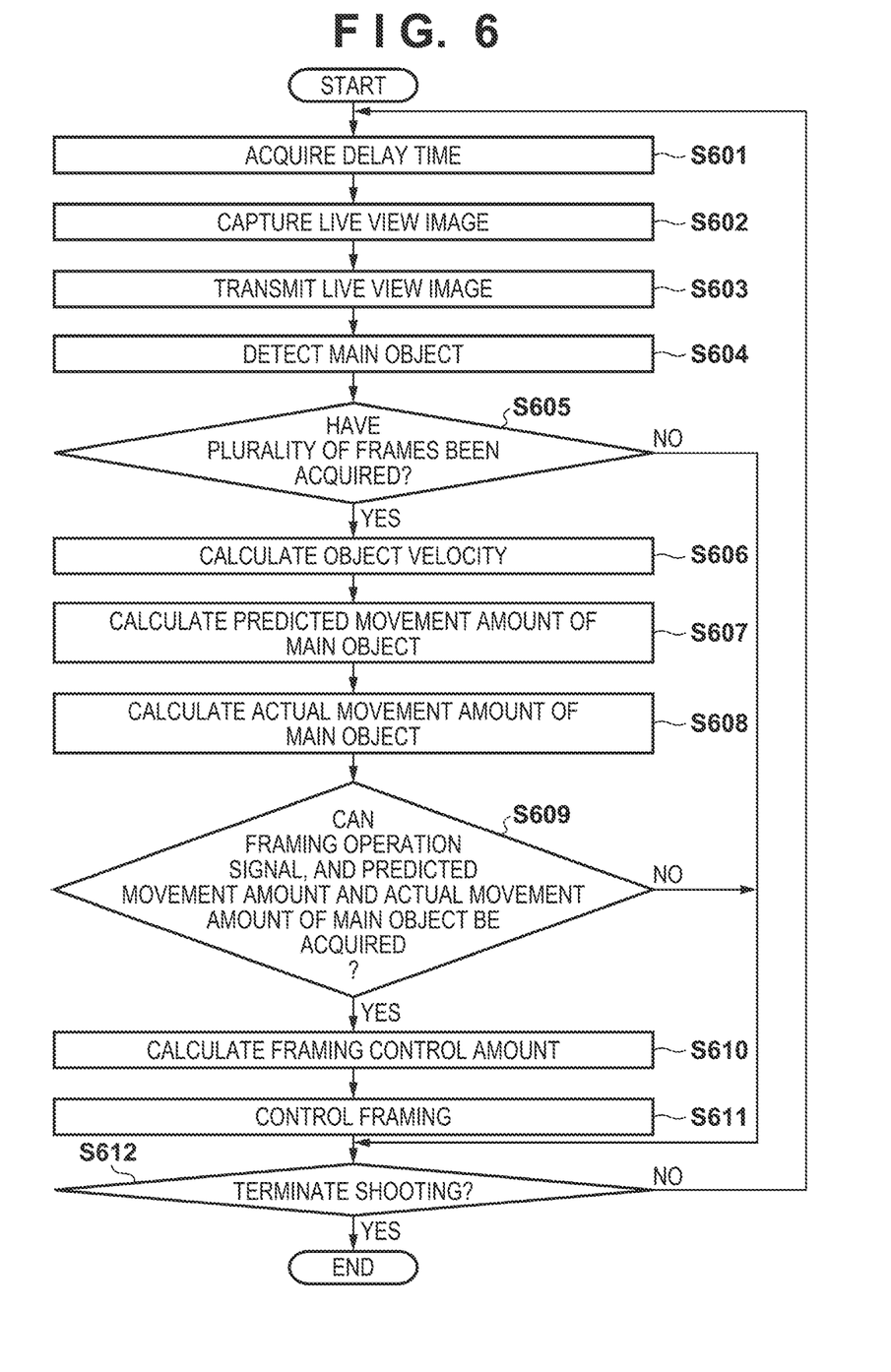
FIG. 6 is a flowchart illustrating a control example according to the first embodiment.

FIG. 6 is a flowchart illustrating a control example according to the first embodiment. FIG. 9 is a timing chart for each processing step in the control example of FIG. 6. In FIG. 9, the horizontal axis indicates a time axis including times T1 to T12, and the vertical axis indicates each processing step in the control example of FIG. 6. FIG. 9 illustrates a temporal relationship of each processing step. The relationship of the length of time of each processing step in FIG. 9 is not necessarily as illustrated in FIG. 9.

The processing in FIG. 6 is realized by the control unit 101 in the image capture apparatus 1 executing a program stored in the non-volatile memory 105, and controlling each of the components of the image capture apparatus 1. Further, the processing in FIG. 6 is started when the image capture apparatus 1 transitions to a shooting mode.

In step S601 (the time T1 in FIG. 9), the delay acquisition unit 403 in the image processing unit 102 acquires the delay time in communication processing between the image capture apparatus 1 and the operation apparatus 2. The delay time is a time until the image capturing unit 106 in the image capture apparatus 1 captures the live view image, the image processing unit 102 processes the live view image, the communication unit 103 transmits the live view image to the communication unit 203 in the operation apparatus 2, the display unit 206 displays the live view image, and, after that the communication unit 203 transmits the operation signal input to the input unit 202 to the communication unit 103 in the image capture apparatus 1, and the optical member of the optical unit 107 is driven based on the operation signal. In this case, it is assumed that the delay time between the communication unit 103 and the communication unit 203 changes depending on a capacity and a condition of a transmission path and a congestion status of the transmission path. The delay time in this case is assumed to be low enough compared with the delay time between the communication unit 103 and the communication unit 203, and also a change due to, for example, a transmission condition is low. Accordingly, the delay time can be acquired by, for example, measuring the time until a dummy operation signal is transmitted from the operation apparatus 2 to the image capture apparatus 1, after transmission of dummy image data from the image capture apparatus 1 to the operation apparatus 2. To obtain the delay time more accurately, time related to another factor in the transmission path may be added. Note that the delay acquisition unit 403 may sequentially acquire the delay time during shooting, or may acquire the delay time prior to shooting.

In step S602, the image capturing unit 106 captures the live view image, and the image processing unit 102 processes the live view image.

In step S603, the communication unit 103 transmits the live view image to the communication unit 203 in the operation apparatus 2. The operation apparatus 2 displays the received live view image on the display unit 206, the input unit 202 receives the operation related to the framing from the user, and the communication unit 203 transmits the operation signal to the image capture apparatus 1. The operation signal includes the direction and the operation amount of the operation related to the framing.

In step S604, the object detection unit 401 detects the main object in the live view image. The known method is used for the detection method of the main object.

In step S605 (the time T3 in FIG. 9), the control unit 101 determines whether the live view images in the plurality of frames required to calculate the velocity of the main object have been captured. In a case when the control unit 101 determines that the live view images in the plurality of frames required to calculate the velocity of the main object have been captured, the control unit 101 advances processing to step S606, and, otherwise, advances processing to step S612.

In step S606 (the time T4 in FIG. 9), the object velocity calculation unit 402 calculates the velocity of the main object. The velocity of the main object is calculated from a difference between the object positions in the plurality of live view images captured by the image capturing unit 106 recently. Note that, using three or more live view images, an object acceleration may be calculated in addition to the object velocity, and may be used for calculating the object movement amount described later.

In step S607 (the time T8 in FIG. 9), the object movement amount calculation unit 404 calculates the predicted movement amount of the main object in the delay time from the delay time acquired by the delay acquisition unit 403 and the object velocity calculated by the object velocity calculation unit 402.

In step S608 (the time T9 in FIG. 9), the object movement amount calculation unit 404 calculates the actual movement amount of the main object before and after the delay time.

In step S609, the control unit 101 determines whether the operation signal received from the operation apparatus 2, the predicted movement amount of the main object, and the actual movement amount of the main object before and after the delay time can be acquired. In a case when the control unit 101 determines that the operation signal received from the operation apparatus 2, the predicted movement amount of the main object, and the actual movement amount of the main object before and after the delay time can be acquired, the control unit 101 advances the processing to step S610, and, otherwise, advances the processing to step S611.

In step S610 (the time T10 in FIG. 9), the framing control amount calculation unit 405 calculates the framing control amount. The framing control amount calculation unit 405 calculates the framing control amount based on the predicted movement amount of the main object calculated by the object movement amount calculation unit 404, the framing operation amount in the operation signal received from the operation apparatus 2, and the actual movement amount of the main object before and after the delay time. Note that, it is assumed that the framing operation amount input by the user operation includes the operation amount related to at least any of the operation amounts in the pan direction and the tilt direction.

Here, the predicted movement amounts of the main object in the pan direction and the tilt direction calculated by the object movement amount calculation unit 404 are indicated by mb(p) and mb(t), respectively, and the framing operation amounts in the pan direction and the tilt direction are indicated by mc(p) and mc(t), respectively. In addition, the actual movement amounts of the main object in the pan direction and the tilt direction, before and after the delay time, are indicated as ma(p) and ma(t), respectively, and the framing control amounts in the pan direction and the tilt direction are indicated as mx(p) and mx(t), respectively. The mb(p), mb(t), ma(p), and ma(t) are defined by displacement of an angle of a line connecting the optical axis of the image capturing unit 106 and the main object. The mc(p), mc(t), mx(p), and mx(t) are defined by angular displacement of the optical axis of the image capturing unit 106. The framing control amount calculation unit 405 calculates mx(p) and mx(t) by the following Equation 1 and Equation 2.

$$mx(p)=ma(p)+(mc(p)-mb(p)) \quad \text{(Equation 1)}$$

$$mx(t)=ma(t)+(mc(t)-mb(t)) \quad \text{(Equation 2)}$$

In Equation 1 and Equation 2 above, (mc(p)−mb(p)) and (mc(t)−mb(t)) are differences between the framing operation amount and the predicted movement amount of the main object, and indicates an object arrangement adjustment amount indicating that the user desires to dispose the object at which position in the frame. That is, the framing control amount is obtained by adjusting the actual movement amount of the main object before and after the delay time with the object arrangement adjustment amount.

In step S611 (the time T11 in FIG. 9), the control unit 101 drives the optical member of the optical unit 107 based on the framing control amount calculated by the framing control amount calculation unit 405.

In step S612, the control unit 101 determines whether a shooting termination has been instructed. In a case when the control unit 101 determines that the shooting termination has been instructed, the control unit 101 terminates the processing, and, otherwise, returns the processing to step S601, and repeats the processing described above.

As described above, according to the first embodiment, even when there is communication delay in a case when the image capture apparatus 1 performs shooting by remote control, accurate framing intended by the user can be achieved.

Second Embodiment

Hereafter, the second embodiment will be described.

The second embodiment is an example of a control method that performs framing with respect to the movement of the object in the front-and-rear direction (zoom direction) in addition to movements of the object in the horizontal direction (pan direction) and in the vertical direction (tilt direction), according to the first embodiment.

In the second embodiment, in addition to the horizontal direction and the vertical direction in the first embodiment, the object in the optical axis direction (zoom direction) of the image capture apparatus 1, and the visual size of the object in the frame is considered in framing. The user performs the framing operation in the zoom direction as well as in the pan direction and the tilt direction, by the operation apparatus 2, to shoot the object.

Figure 7:
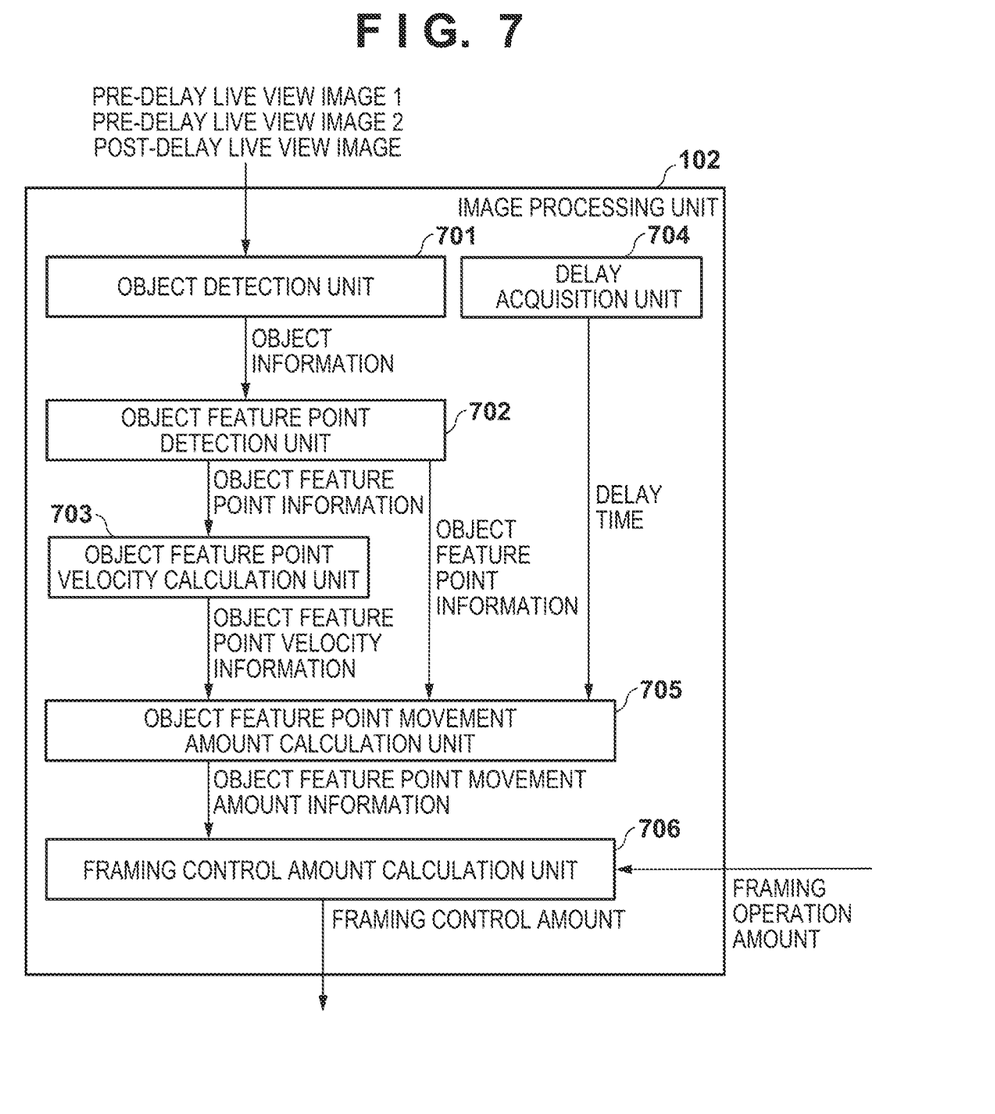
FIG. 7 is a block diagram illustrating a configuration of an image processing unit in an image capture apparatus according to a second embodiment.

FIG. 7 is a block diagram illustrating the configuration and the functions of the image processing unit 102 according to the second embodiment.

The image processing unit 102 includes an object detection unit 701, an object feature point detection unit 702, an object feature point velocity calculation unit 703, a delay acquisition unit 704, an object feature point movement amount calculation unit 705, and a framing control amount calculation unit 706. The difference from the first embodiment is that the image processing unit 102 detects a plurality of feature points of the object, calculates a velocity and a movement amount of each of the feature points, and calculates a framing control amount from the calculated movement amount of each of the feature points.

The other configuration of the image capture apparatus 1 and the configuration of the operation apparatus 2 are similar to those of the first embodiment.

The object detection unit 701 detects a predetermined object (hereafter, a main object) in the live view image generated by the image capturing unit 106, and outputs object information, which is the detection result, to the object velocity calculation unit 402.

The object feature point detection unit 702 detects the feature point of the main object detected by the object detection unit 701.

The object feature point velocity calculation unit 703 calculates the velocity of the feature point of the main object detected by the object detection unit 701 from the live view images in a plurality of frames generated by the image capturing unit 106, and outputs object feature point velocity information, which is the calculation result, to the object feature point movement amount calculation unit 705.

The delay acquisition unit 704 acquires the delay time until the optical unit 107 is driven by the framing operation after the image capturing unit 106 captures the live view image and outputs the acquired delay time information to the object feature point movement amount calculation unit 705.

The object feature point movement amount calculation unit 705 calculates the predicted movement amount of the feature point of the main object in the delay time based on the velocity of the feature point of the main object calculated by the object feature point velocity calculation unit 703 and the delay time acquired by the delay acquisition unit 704. Then, the object feature point movement amount calculation unit 705 outputs object movement amount information, which is the calculation result, to the framing control amount calculation unit 706. In addition, the object feature point movement amount calculation unit 705 calculates the actual movement amount of the feature point of the main object based on the live view images before and after the delay time, includes the movement in the object movement amount information, and outputs the movement to the framing control amount calculation unit 706.

The framing control amount calculation unit 706 calculates the framing control amount of the optical unit 107 based on the predicted movement amount of the feature point of the main object calculated by the object feature point movement amount calculation unit 705, the framing operation amount input from the operation apparatus 2, and the actual movement amount of the feature point of main object in the delay time. Then, the framing control amount calculation unit 706 outputs the framing control amount, which is the calculation result, to the control unit 101. The control unit 101 drives the optical member of the optical unit 107 based on the framing control amount calculated by the framing control amount calculation unit 405.

Next, a control example according to the second embodiment will be described with reference to FIGS. 8 and 9.

Figure 8:
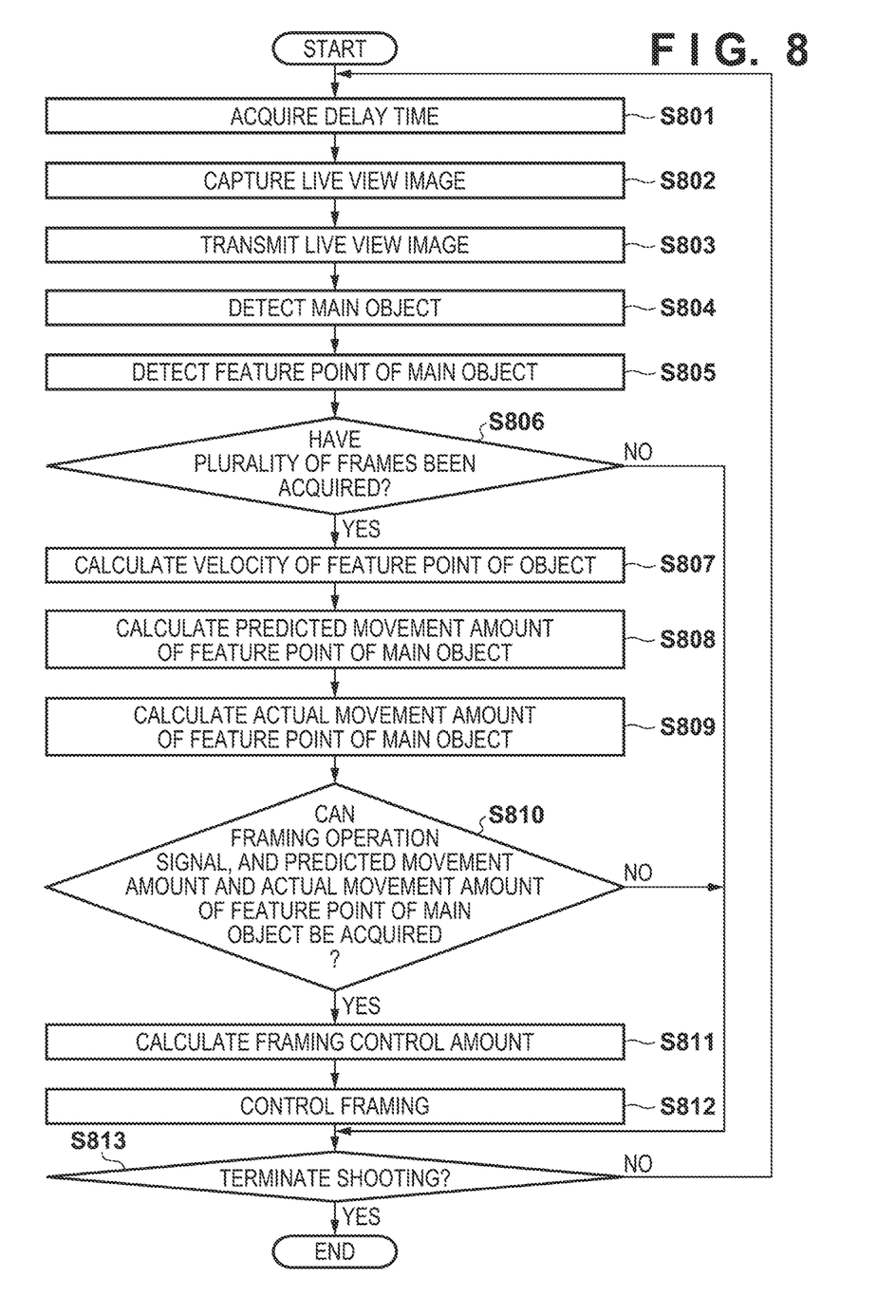
FIG. 8 is a flowchart illustrating a control example according to the second embodiment.

FIG. 8 is a flowchart illustrating a control example according to the second embodiment. The processing in FIG. 8 is realized by the control unit 101 in the image capture apparatus 1 executing a program stored in the non-volatile memory 105, and controlling each of the components of the image capture apparatus 1. Further, the processing in FIG. 8 is started when the image capture apparatus 1 transitions to a shooting mode.

In step S801 (the time T1 in FIG. 9), the delay acquisition unit 704 in the image processing unit 102 acquires the delay time in communication processing between the image capture apparatus 1 and the operation apparatus 2. The method and the timing of acquiring the delay time are as described in step S601 in FIG. 6.

In step S802, the image capturing unit 106 captures the live view image, and the image processing unit 102 processes the live view image.

In step S803, the communication unit 103 transmits the live view image to the communication unit 203 in the operation apparatus 2. The operation apparatus 2 displays the received live view image on the display unit 206, the input unit 202 receives the operation related to the framing from the user, and the communication unit 203 transmits the operation signal to the image capture apparatus 1. The operation signal includes the direction and the operation amount of the operation related to the framing.

In step S804, the object detection unit 701 detects the main object in the live view image. The known method is used for the detection method of the main object.

In step S805, the object feature point detection unit 702 detects the feature point of the main object. A plurality of the feature points of the main object are detected. The known method is used for the detection method of the feature point of the main object.

In step S806 (corresponding to the time T3 in FIG. 9), the control unit 101 determines whether the live view images in the plurality of frames required to calculate the velocity of the feature point of the main object have been captured. Here, it is determined whether the live view image for calculating the velocity of at least one feature point among the plurality of detected feature points has been captured. In a case when the control unit 101 determines that the live view images in the plurality of frames required to calculate the velocity of the feature point of the main object have been captured, the control unit 101 advances processing to step S807, and, otherwise, advances processing to step S813.

In step S807 (corresponding to the time T4 in FIG. 9), the object feature point velocity calculation unit 703 calculates the velocity of the feature point of the main object. The velocity of the feature point of the main object is calculated from a difference between the positions of the feature points of the object in the plurality of live view images captured by the image capturing unit 106 recently. Note that, using three or more live view images, an acceleration of the feature point of the object may be calculated in addition to the velocity of the feature point of the main object, and may be used for calculating the movement amount of the feature point of the main object described later.

In step S808 (corresponding to the time T8 in FIG. 9), the object feature point movement amount calculation unit 705 calculates the predicted movement amount of the feature point of the main object in the delay time from the delay time acquired by the delay acquisition unit 704 and the velocity of the feature point of the main object calculated by the object feature point velocity calculation unit 703.

In step S809 (corresponding to the time T9 in FIG. 9), the object feature point movement amount calculation unit 705 calculates the actual movement amount of the feature point of the main object in the delay time.

In step S810, the control unit 101 determines whether the operation signal received from the operation apparatus 2, the predicted movement amount of the feature point of the main object, and the actual movement amount of the feature point of the main object in the delay time can be acquired. In a case when the control unit 101 determines that the operation signal received from the operation apparatus 2, the predicted movement amount of the feature point of the main object, and the actual movement amount of the feature point of the main object in the delay time can be acquired, the control unit 101 advances the processing to step S811, and, otherwise, advances the processing to step S813.

In step S811 (corresponding to the time T10 in FIG. 9), the framing control amount calculation unit 706 calculates the framing control amount. The framing control amount calculation unit 706 calculates the framing control amount based on the predicted movement amount of the feature point of the main object calculated by the object feature point movement amount calculation unit 705, the framing operation amount in the operation signal received from the operation apparatus 2, and the actual movement amount of the feature point of the main object in the delay time. Note that, it is assumed that the framing operation amount input by the user operation includes the operation amount related to at least any of the operation amounts in the pan direction and the tilt direction.

Here, the amount calculated by the object feature point movement amount calculation unit 705 is defined as follows.

Movement Amount of Feature Point of Main Object
  Pan direction: mb(p) [1], mb(p) [2], . . . , mb(p) [n]
  Tilt direction: mb(t) [1], mb(t) [2], . . . , mb(t) [n]
Framing Operation Amount
  Pan direction: mc(p)
  Tilt direction: mc(t)
  Zoom direction: mc(z)
Actual Movement Amount of Feature Point of Main Object in Delay Time
  Pan direction: ma(p) [1], ma(p) [2], . . . , ma(p) [n]
  Tilt direction: ma(t) [1], ma(t) [2], . . . , ma(t) [n]

Framing Control Amount
Pan direction: mx(p)
Tilt direction: mx(t)
Zoom direction: mx(z)

Note that [*] indicates the amount related to the n-th detected feature point, and n indicates the number of feature points of the object detected by the object feature point detection unit 702.

The mb(p), mb(t), ma(p), and ma(t) are defined as the changes in the angles of the line connecting the optical axis of the image capturing unit 106 and the main object in the pan direction and the tilt direction. The mc(p), mc(t), mx(p), and mx(t) are defined as the changes in the angles of the optical axis of the image capturing unit 106 in the pan direction and the tilt direction. The mc(z) and mx(z) are defined as changes in distances (focal length) from the center of the lens of the optical unit 107 to the image capturing unit 106. The framing control amount calculation unit 706 calculates mx(p) and mx(t) by the following Equation 3, Equation 4, Equation 5, or Equation 6, as an average of the framing control amount for each feature point.

$$mx(p)=(mx(p)[1]+mx(p)[2]+\ldots+mx(p)[n])/n \quad \text{(Equation 3)}$$

$$mx(p)[1]=ma(p)[1]+(mc(p)-mb(p)[1])$$

$$mx(p)[2]=ma(p)[2]+(mc(p)-mb(p)[2])$$

$$\ldots$$

$$mx(p)[n]=ma(p)[n]+(mc(p)-mb(p)[n]) \quad \text{(Equation 4)}$$

$$x(t)=(mx(t)[1]+mx(t)[2]+\ldots+mx(t)[n])/n \quad \text{(Equation 5)}$$

$$mx(t)[1]=ma(t)[1]+(mc(t)-mb(t)[1])$$

$$mx(t)[2]=ma(t)[2]+(mc(t)-mb(t)[2])$$

$$\ldots$$

$$mx(t)[n]=ma(t)[n]+(mc(t)-mb(t)[n]) \quad \text{(Equation 6)}$$

Also, mx(z) is obtained from the movement amounts of a plurality of the feature points. In the present embodiment, an example of using the movement amounts of the two feature points will be described as the simplest example. The mx(z) is calculated by the following Equation 7 and Equation 8.

$$mx(z)=ma(z)+(mc(z)-mb(z)) \quad \text{(Equation 7)}$$

$$ma(z)=|ma(p)[i]-ma(p)[j]| \, mb(z)=|mb(p)[i]-mb(p)[j]| \quad \text{(Equation 8)}$$

In Equation 8, i and j are arbitrary two different object feature points. In the present embodiment, an example in which the directions of the framing operation and the framing control are the pan direction, the tilt direction, and the zoom direction has been described. However, performing the similar arithmetic operation enables further expanding the directions of the framing operation and the framing control to a roll direction (a rotation direction about the optical axis) and parallel movement in each of the directions of top and bottom, left and right, and front and rear.

In step S812 (corresponding to the time T11 in FIG. 9), the control unit 101 drives the optical member of the optical unit 107 based on the framing control amount calculated by the framing control amount calculation unit 706.

In step S813, the control unit 101 determines whether a shooting termination has been instructed. In a case when the control unit 101 determines that the shooting termination has been instructed, the control unit 101 terminates the processing, and, otherwise, returns the processing to step S801, and repeats the processing described above.

Note that operations other than the operations described above are similar to those of the first embodiment.

As described above, according to the second embodiment, even when there is communication delay in a case when the image capture apparatus 1 performs shooting by remote control, accurate framing intended by the user can be achieved.

In addition, compared with the first embodiment, even when the object moves in the optical axis direction of the image capture apparatus 1, accurate framing intended by the user can be achieved.

Note that, in the embodiments described above, an example in which the optical unit 107 is controlled in at least any of the pan direction, the tilt direction, and the zoom direction as the flame control has been described, but the present invention is not limited thereto, and may be realized by extraction processing of the image based on the framing operation, for example.

Note that, it has been described that the above-described operations are performed by the control unit 101 in the image capture apparatus 1, but may be performed by a single piece of hardware, and the entire devices may be controlled by dividing up the processing among a plurality of pieces of hardware (for example, a plurality of processors or circuits).

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or the apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image capture apparatus that is remotely controllable by an operation apparatus, the image capture apparatus comprising:
   at least one processor; and
   a memory storing instructions that, when executed by the at least one processor, causes the image capture apparatus to function as:
   an image capturing unit that captures an image;
   a communication unit that communicates with the operation apparatus;
   an image processing unit that detects an object in the image;
   a control unit that performs framing control of the image, including the object, based on a framing operation received from the operation apparatus after the communication unit transmits the image to the operation apparatus; and
   a delay acquisition unit that acquires a delay time in the communication processing with the operation apparatus,
   wherein the image processing unit calculates a framing control amount based on a predicted movement amount of the object in the delay time, an actual movement amount of the object before and after the delay time, and a framing operation amount received from the operation apparatus,
   the control unit performs the framing control based on the framing control amount, and
   the delay acquisition unit acquires the delay time, before image capturing, in advance.

2. The image capture apparatus according to claim 1, wherein the image processing unit includes:
   an object detection unit that detects a main object in the image;
   an object velocity calculation unit that calculates a velocity of the main object from a plurality of frame images generated by the image capturing unit;
   an object movement amount calculation unit that calculates a predicted movement amount of the main object in the delay time, based on the velocity of the main object and the delay time, and calculates an actual movement amount of the main object based on the images before and after the delay time; and
   a framing control amount calculation unit that calculates the framing control amount based on the predicted movement amount of the main object in the delay time, the framing operation amount input from the operation apparatus, and the actual movement amount of the main object before and after the delay time.

3. The image capture apparatus according to claim 1, wherein the image processing unit includes:
   an object detection unit that detects a main object in the image;
   an object feature point detection unit that detects a feature point of the main object;
   an object feature point velocity calculation unit that calculates a velocity of the feature point of the main object from a plurality of frame images generated by the image capturing unit;
   an object feature point movement amount calculation unit that calculates a predicted movement amount of the feature point of the main object in the delay time, based on the velocity of the feature point of the main object and the delay time, and calculates an actual movement amount of the feature point of the main object based on the images before and after the delay time; and
   a framing control amount calculation unit that calculates the framing control amount based on the predicted movement amount of the feature point of the main object in the delay time, the framing operation amount input from the operation apparatus, and the actual movement amount of the feature point of the main object before and after the delay time.

4. The image capture apparatus according to claim 1, wherein the delay time is a time until an optical unit is driven, based on the framing operation, after the image capturing unit captures the image and transmits the image to the operation apparatus.

5. The image capture apparatus according to claim 1, wherein directions of the framing operation and the framing control include at least one of a pan direction, a tilt direction, and a zoom direction, with respect to an optical axis of the image capturing unit.

6. The image capture apparatus according to claim 5, wherein the framing control includes control that drives an optical unit in at least in one of the pan direction, the tilt direction, and the zoom direction.

7. The image capture apparatus according to claim 5, wherein the framing control includes extraction processing of an image based on at least one of the pan direction, the tilt direction, and the zoom direction.

8. A method of controlling an image capture apparatus that includes an image capturing unit that captures an image and is remotely controllable by an operation apparatus, the method comprising:
   communicating with the operation apparatus;
   detecting an object in the image;
   performing framing control of the image, including the object, based on a framing operation received from the operation apparatus after transmitting the image to the operation apparatus; and
   acquiring a delay time in the communicating with the operation apparatus, the delay time being acquired, before image capturing, in advance,
   wherein the framing control is performed based on a framing control amount calculated based on the delay time in the communicating with the operation apparatus, a predicted movement amount of the object in the delay time, an actual movement amount of the object before and after the delay time, and a framing operation amount received from the operation apparatus.

9. The method according to claim 8, wherein the detecting includes:
   detecting a main object in the image;
   calculating a velocity of the main object from a plurality of frame images generated by the image capturing unit;
   calculating a predicted movement amount of the main object in the delay time based on the velocity of the main object and the delay time, and calculating an actual movement amount of the main object based on the images before and after the delay time; and
   calculating a framing control amount based on the predicted movement amount of the main object in the delay time, the framing operation amount input from the operation apparatus, and the actual movement amount of the main object before and after the delay time.

10. The method according to claim 8, wherein the detecting includes:
    detecting a main object in the image;
    detecting a feature point of the main object;

calculating a velocity of the feature point of the main object from a plurality of frame images generated by the image capturing unit;

calculating a predicted movement amount of the feature point of the main object in the delay time based on the velocity of the feature point of the main object and the delay time, and calculating an actual movement amount of the feature point of the main object based on the images before and after the delay time; and calculating the framing control amount based on the predicted movement amount of the feature point of the main object in the delay time, the framing operation amount input from the operation apparatus, and the actual movement amount of the feature point of the main object before and after the delay time.

11. The method according to claim 8, wherein the delay time is a time until an optical unit is driven, based on the framing operation, after the image capturing unit captures the image and transmits the image to the operation apparatus.

12. The method according to claim 8, wherein directions of the framing operation and the framing control include at least one of a pan direction, a tilt direction, and a zoom direction with respect to an optical axis of the image capturing unit.

13. The method according to claim 12, wherein the framing control includes control that drives an optical unit in at least in one of the pan direction, the tilt direction, and the zoom direction.

14. The method according to claim 12, wherein the framing control includes extraction processing of an image based on at least one of the pan direction, the tilt direction, and the zoom direction.

15. A non-transitory computer-readable storage medium storing a program that causes a computer to execute a method of controlling an image capture apparatus that includes an image capturing unit that captures an image and is remotely controllable by an operation apparatus, the method comprising:

communicating with the operation apparatus;

detecting an object in the image;

performing framing control of the image including the object based on a framing operation received from the operation apparatus after transmitting the image to the operation apparatus;

acquiring a delay time in the communicating with the operation apparatus, the delay time being acquired, before image capturing, in advance, wherein the framing control is performed based on a framing control amount calculated based on a delay time in communication processing with the operation apparatus, a predicted movement amount of the object in the delay time, an actual movement amount of the object before and after the delay time, and a framing operation amount received from the operation apparatus.

* * * * *